United States Patent [19]

Schroeder et al.

[11] 4,359,495

[45] Nov. 16, 1982

[54] RETORT-STERILIZABLE POUCH

[75] Inventors: Carl W. Schroeder; Joseph R. Webster, both of Houston, Tex.

[73] Assignee: Shell Oil Company, Houston, Tex.

[21] Appl. No.: 237,830

[22] Filed: Feb. 25, 1981

[51] Int. Cl.³ .................. B32B 1/02; B32B 15/08; B65D 37/00
[52] U.S. Cl. ................................. 428/35; 428/458; 428/461; 428/516; 156/244.11; 525/387; 525/222; 426/126; 206/524.2; 229/3.5 MF; 525/240; 264/176 R
[58] Field of Search ............... 428/35, 461, 516, 458; 525/222, 334, 335

[56] References Cited

U.S. PATENT DOCUMENTS 4,049,904 9/1977 Hori et al. .............................. 428/461
4,190,477 2/1980 Ossian et al. ............................ 428/35
4,291,085 9/1981 Ito et al. ................................. 428/516

FOREIGN PATENT DOCUMENTS

202739/A 2/1980 United Kingdom .

Primary Examiner—P. Ives
Attorney, Agent, or Firm—Dean F. Vance

[57] ABSTRACT

In a retort-sterilizable laminated structure comprising an aluminum foil or sheet, a heat-sealable polymer layer, and a heat-resistant resin layer, the heat-sealable layer is the cracked product of the blend of a poly(propylene-ethylene) copolymer and an ethylene-vinyl acetate copolymer. This heat-sealable layer composition has improved flow properties and may be extrusion-coated onto a metal film substrate at high speeds.

9 Claims, No Drawings

RETORT-STERILIZABLE POUCH

BACKGROUND OF THE INVENTION

1. Field of the Invention

This invention is directed to a new composition useful as the heat-sealable layer in a retort-sterilizable pouch, and to a process for forming such a retort-sterilizable pouch.

2. Description of the Prior Art

The retortable pouch is a sterilizable, flexible, long shelflife food package intended to compete with the conventional tin can. The pouch for foodstuffs is typically a laminate consisting of three plies, namely 0.5 mil polyester on the outside, 0.35 mil aluminum foil in the middle and 3.0 mil polypropylene copolymer or modified high density polyethylene film on the inside. Such laminated retort-sterilizable pouchs have been available for many years. See, e.g., U.S. Pat. No. 4,190,477 and U.K. Patent Application GB 2,027,391A.

One means to reduce costs and improve the product would be to extrusion coat the heat-sealable, polypropylene-based composition directly onto the aluminum rather than purchase film and carry out a laminating process. However, in order to achieve proper economics, it would be necessary to be able to deposit a 3 mil film at a coating speed of over about 400 feet per minute. In contrast, before now it has only been possible to achieve speeds of about 120 ft/min using conventional polymers or blends before uncontrolled surging (draw resonance) occurs. What is needed is a polymer composition that can be extruded at high speeds and that will result in a retort-sterilizable pouch having acceptable property values.

SUMMARY OF THE INVENTION

The present invention broadly encompasses a novel composition having improved flow properties, making it especially useful in retort-sterilizable pouches. The composition comprises the cracked product of the blend of a polypropylene copolymer and an ethylene-vinyl acetate copolymer wherein:

(a) the melt flow of said cracked product is between about 15 and about 50 grams per 10 minutes, (ASTM D1328 condition L);

(b) said polypropylene copolymer is a propylene-ethylene copolymer comprising between about 1 and about 10 percent by weight ethylene and has a melt flow of between about 0.05 and about 15 grams per 10 minutes, (ASTM D1328 condition L); and (c) said ethylene-vinyl acetate copolymer has a vinyl acetate content of between about 15 and about 30 percent by weight, and has a melt flow of between about 1 and about 30 grams per 10 minutes, condition E.

Also contemplated herein are the process for extrusion of a polymer film on a substrate employing such a polymer composition and a retort-sterilizable laminated structure containing such a polymer composition as the heat-sealable polymer layer.

Compositions according to the present invention have been coated on substrates at speeds of greater than 400 feet per minute without evidence of any surging or draw resonance. Further, the property balance of polymer-metal laminates or retortable pouches containing such polymer compositions has been excellent. The use of compositions according to the present invention results in laminates having more than acceptable peel strength (adhesion), heat seal strength and impact resistance.

DETAILED DESCRIPTION OF THE INVENTION

There are two basic polymer components in the compositions of the present invention: a propylene-ethylene copolymer and an ethylene-vinyl acetate copolymer.

The propylene-ethylene copolymer (which may be random, block, or any combination thereof) preferably contains between about 1.0 and about 10 percent by weight ethylene, preferably between about 2.0 and about 6.0 percent by weight ethylene. Typical melt flow values are between about 0.5 and about 15 grams per 10 minutes, ASTM D1328 condition L, preferably between about 1 and about 10 grams per 10 minutes. These polypropylene copolymers are preferred over high density polyethylene since they can be retorted or sterilized at 120° C. versus 110° C. for high density polyethylene.

Preferred commercial polymers include Shell 6675 and 7522 copolymers and DN 6009, a developmental Shell grade.

The ethylene-vinyl acetate copolymers which are to be used in the compositions of the invention correspond to the general formula

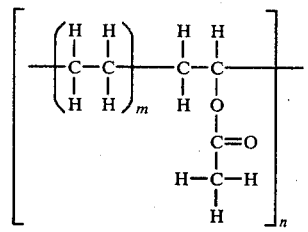

The actual occurrence of the acetate substituents along the hydrocarbon chain is of a random character and thus the letter m denotes the average number of ethylene units per vinyl acetate unit in the molecule rather than the presence of regularly recurrent units having the composition given within the above brackets. The percent by weight vinyl acetate in the copolymer ranges from about 15% to 30%, preferably from 18% to 28%. The most useful melt indicies range from about 2 to about 12 grams per 10 minutes. An excellent copolymer is DuPont's Elvax 360 which has a melt flow of 6.0, condition E, and contains about 25% w vinyl acetate.

The ethylene-vinyl acetate copolymer (EVA) is essential in order to give impact strength to the compositions. Accordingly, the compositions preferably contain between about 5 and about 20 percent by weight EVA, more preferably between about 6 and about 15 percent by weight EVA, the remainder consisting of the propylene-ethylene copolymer component.

The above polymer blends are then cracked to a melt flow of between about 15 and about 65 grams per 10 minutes, condition L. Preferred melt flow values are between about 15 and about 50 grams per 10 minutes, more preferably between about 15 and about 35 grams per 10 minutes.

Cracking of the polymer blend refers to subjecting the blend to thermal and/or chemical processes to crack the heavier components therein narrowing the molecular weight distribution and increasing the melt flow indicies. Among the various cracking processes which may be useful herein include high temperature thermal cracking, peroxide cracking, and radiation cracking. Thermal cracking involves subjecting the blend to temperatures above about 315° C. at elevated pressures for a sufficient time to increase the melt flow to the desired range. Radiation cracking includes both election beam and cobalt 60 methods. Standard techniques for the peroxide cracking of polymers in an extruder are well known and include the processes disclosed in U.S. Pat. No. 3,144,436 and U.S. Pat. No. 3,887,534. Preferred peroxides are aliphatic peroxides. The amount of peroxide and the cracking temperature depend upon the melt flows of the starting polymers and the desired melt flow of the final composition. Illustrative Embodiment I discloses the effect of varying peroxide content on melt flow. Typical amounts of peroxide are between about 300 parts by weight per million parts by weight total polymer (ppmw) and about 1500 ppmw. Typical cracking temperatures are between about 175° C. and about 300° C.

The cracked product is especially useful as the heat-sealable layer in a retort-sterilizable pouch. The overall construction of such pouches is disclosed in U.S. Pat. No. 4,190,477 and U.K. Patent Application No. 2,027,391A. One basic difference between the process according to this invention and the process disclosed in the above two cited patents, is that in the present invention the heat-sealable layer is formed by direct extrusion onto the aluminum foil or sheet, whereas in the two patents the heat-sealable layer is first formed into a ply which is then laminated onto the aluminum sheet.

The invention is further illustrated by reference to the following Illustrative Emdodiments, which are given for the purpose of illustration only and are not meant to limit the invention to the particular reactants and conditions employed therein.

ILLUSTRATIVE EMBODIMENT I

Illustrative Embodiment I discloses the effect that varying the amount of peroxide has on the melt flow of the resulting cracked product. In each case the polymer composition comprised a polypropylene copolymer and varying amounts of a vinyl acetate copolymer. The polypropylene copolymer was Rexene 32S5 containing 1% ethylene and having a melt flow (condition L) of 5. The ethylene-vinyl acetate copolymer was Elvax 360 having a nominal vinyl acetate content of 25% by weight and a melt flow (condition E) of 6.2.

The peroxide was added to the polymer blend in two different manners. In some cases the cracking was carried out using a peroxide-polyethylene masterbatch containing 4% active peroxide. In other cases the cracking was carried out using 100% liquid peroxide. In all cases the peroxide employed was an aliphatic peroxide.

The cracked product was obtained by extruding the polymers and the peroxide in a 2½ inch MPM extruder using a melt temperature of 205° to 232° C. The results are presented below in Table 1.

TABLE 1

CRACKING OF POLYPROPYLENE CONTAINING ETHYLENE/VINYL ACETATE COPOLYMER WITH PEROXIDE

| Number | Percent by weight Elvax 360 | 4% Peroxide in Polyethylene | 100% Liquid Peroxide | Melt Flow Cond. L g/10 min. |
|---|---|---|---|---|
| 1 | 5 | 0 | — | 6.2 |
| 2 | 5 | 700 | — | 27.0 |
| 3 | 5 | 850 | — | 28.5 |
| 4 | 5 | 1000 | — | 36.6 |
| 5 | 5 | 1000 | — | 38.1 |
| 6 | 10 | 0 | — | 6.0 |
| 7 | 10 | 1000 | — | 31.8 |
| 8 | 15 | 0 | — | 6.0 |
| 9 | 15 | 1000 | — | 30.0 |
| 16 | 10 | — | 0 | 6.2 |
| 17 | 10 | — | 500 | 24.2 |
| 18 | 10 | — | 800 | 31.7 |

ILLUSTRATIVE EMBODIMENT II

In Illustrative Embodiment II, various compositions were prepared based on Shell DN 6005 (a polypropylene-ethylene copolymer), which contains about 1.9% by weight ethylene and has a melt flow, condition L of about 8. The other component in the blends was either Shell 0300 Polybutylene or Elvax 360 ethylene-vinyl acetate copolymer. The product compositions were made by extruding mixtures of copolymer powder with polybutylene or EVA pellets on a 2½ inch Prodex extruder. The homogeneous blends were then coated with 100% liquid peroxide and re-extruded on the Prodex extruder to produce the cracked products. The products submitted for evaluation were as follows:

| Number | Blend Component | Peroxide ppmw | Melt Flow |
|---|---|---|---|
| WRS 5-295 | 10% w. Polybutylene 0300 | None | 9 |
| WRS 5-296 | 10% w. Polybutylene 0300 | 450 | 49 |
| WRS 5-297 | 10% w. Elvax 360 | 900 | 62 |

The results (Table 2) obtained on the cracked products were highly encouraging. A speed run was made first on paper substrate at maximum screw rpm (150) to determine how fast the substrate can be run before surging (draw resonance) occurs. Since three mil films are required for testing, the films obtained during the speed test are usually too thin. After the speed test, aluminum foil was introduced to the system and coated at a screw speed of 90 rpm and a substrate speed of 100 ft/min to obtain a three mil coating.

For prior art compositions, coating speeds of only about 125 ft/min are achievable. the data on Table 2 show that an amazing substrate speed of 400 ft/min was achievable with compositions according to the present invention.

TABLE 2

EXTRUSION COATING OF ALUMINUM WITH POLYPROPYLENE FOR EVALUATION IN RETORTABLE POUCHES

| Number | Polypropylene Type | Melt Flow Condition L dg/min | Screw rpm | Substrate Speed ft-min | Melt Temp. °F. | Coating Uniformity |
|---|---|---|---|---|---|---|
| WRS5-295 | DN 6005 (1.9% Et) | 9 | 150 | 250 | 520 | surging |
| WRS5-295 | plus 10% Poly- | | 150 | 200 | 520 | satisfactory |
| WRS5-295 | butylene 0300 | | 90 | 100 | 520 | excellent |
| WRS5-296 | DN 6005 (1.9% Et) | 49 | 150 | 400 | 500 | excellent |

TABLE 2-continued
EXTRUSION COATING OF ALUMINUM WITH POLYPROPYLENE FOR EVALUATION IN RETORTABLE POUCHES

| Number | Polypropylene Type | Melt Flow Condition L dg/min | Screw rpm | Substrate Speed ft-min | Melt Temp. °F. | Coating Uniformity |
|---|---|---|---|---|---|---|
| WRS5-296 | plus 10% Polybutylene 0300 | | 90 | 100 | 500 | excellent |
| WRS5-297 | DN 6005 (1.9% Et) | 62 | 150 | 400 | 470 | excellent |
| WRS5-297 | plus 10% Ethylene | | 90 | 100 | 470 | excellent |
| WRS5-297 | Vinyl Acetate | | 150 | 400 | 500 | excellent |
| WRS5-297 | Copolymer | | 90 | 100 | 500 | excellent |
| WRS6-75 | Rexene 13S-5[1] | 5 | 150 | 120 | 520 | excellent |
| WRS6-76 | Rexene 13S-5[1] | 5 | 150 | 200 | 520 | poor |
| WRS-74 | Rexene 23S-2(6313)[2] | 75 | 150 | 300 | 470 | excellent |

[1]Random copolymer w. polypropylene postblock: 2.1% ethylene.
[2]Random copolymer w. polypropylene postblock: 2.5% ethylene.

Table 3 presents the evaluation of retortable pouches made from the compositions of Table 2. In the table, ND means not determined. Peel Strength, Heat Seal Strength and Drop Test are all standard tests in the industry. In the Drop Test, 10 pouches are dropped in each cycle. The product specification is that after 6 cycles, only 40% or less should fail.

From Table 3, it is clear that the low flow, uncracked polybutylene product, high flow, cracked polybutylene product and high flow, cracked EVA product all passed the peel strength and heat seal strength tests. However, the high flow, cracked polybutylene product clearly failed the drop test, while the other two products came very close. Since the low flow, uncracked polybutylene product cannot be coated at high speeds, it is clear that the cracked, high flow EVA product according to the present invention is superior to any of the other products. It is important to also point out that unmodified polypropylene polymers clearly failed the drop tests.

TABLE 3
EVALUATION OF RETORTABLE POUCHES MADE FROM SHELL POLYPROPYLENE

| Number | Peel Strength lbs/in | Heat Seal Strength lbs Before Retort | Heat Seal Strength lbs After Retort | Drop Test % Failed Cycle Number 1 | 2 | 5 | 6 |
|---|---|---|---|---|---|---|---|
| WRS5-295 | 4.6 | 21 | 6.0 | 0 | 0 | 0 | 80 |
| WRS5-296 | 5.0 | 21 | 12-13 | 0 | 80 | ND | 100 |
| WRS5-297 | 3.0 | 17 | 12-13 | 0 | 0 | 0 | 60 |
| WRS6-75 | 3.0 | ND | — | 100 | ND | ND | ND |
| WRS6-74 | 3.4 | 17 | — | 40 | ND | ND | 100 |
| Product Minimum | 2.5 | 12 | — | 0 | — | — | 40 |

ILLUSTRATIVE EMBODIMENT III

Illustrative Embodiment III was conducted in a similar manner to Illustrative Embodiment II except for three basic modifications. These modifications were:
(a) raising the ethylene content in the copolymer from 1.9 to 2.4%,
(b) circulating air over the pellets in the Whitlock dryer to remove volatile cracking components, and
(c) raising the concentration of modifier from 10% to 12.5% in the case of EVA and from 10% to 20% in the case of the polybutylene.

The results of the coating trials (Table 4) were as follows: All the products passed the heat seal minimum. The 75 MF, EVA-containing product had exceptional adhesion; the others passed.

The extruder had been refitted and could be run at a maximum rpm of 250 rather than 150. A three mil coating could be obtained at an rpm of 250 and a substrate speed of 250 ft/min rather than the previous 90 rpm and 100 ft/min substrate speed.

As usual a speed-run on paper was made first to determine how fast the substrate speed could be run without obtaining surging (draw resonance). Aluminum foil was then introduced and conditions were set to give a 3 mil film. In this case an rpm of 250 and a substrate speed of 250 ft/min gave the desired thickness. The 75 melt flow EVA-modified product ran at a phenomenal rate of 600 ft/min without surging. The 50 MF, EVA product was only taken to 500 ft but probably could have been taken to 600 ft/min also. All of the polybutylene-modified products gave problems in that the overcoat (polymer beyond the substrate) stuck to the chill roll causing takeoff problems.

Evaluation of the pouches (Table 5) showed the following: Heat seal strength after retorting dropped below minimum specification. The 50 MF EVA modified product performed the best, giving a strength of 15 lbs. Competitive products pass this test but none of them can be coated at speeds above 300 ft/min.

Taste was much improved over previous samples and was close to being satisfactory. Taste is presumably due to peroxide fragments or by-products of cracking. These data indicate that distasteful by-products can be removed.

None of the products passed the minimum drop test specification. The 50 MF, EVA-modified product however came way close to passing with zero failures after 4 drops and only 6 failures after 6 drops vs. specification of a maximum of 4 failures out of 10 pouches after 6 drops.

TABLE 4

EXTRUSION COATING OF ALUMINUM WITH MODIFIED RANDOM COPOLYMER[1]

| Number WRS6 | Modifier % W EVA 360 | PB0300 | Melt Flow | Melt Temp. | Screw Speed Ft/Min | Substrate Speed ft/min | Substrate | Thickness Lbs Per Ream | Mils | Coating Uniformity | Strength Properties Adhesion Lbs | Heat Seal Lbs |
|---|---|---|---|---|---|---|---|---|---|---|---|---|
| 91 | 12.5 | — | 75 | 500° F. | 75 | 90 | Paper | — | — | — | — | — |
| 91 | 12.5 | — | 75 | 500° F. | 240 | 250 | Paper | 35 | 2.5 | exc. | — | — |
| 91 | 12.5 | — | 75 | 500° F. | 250 | 250 | Paper | 39 | 3.0 | exc. | — | — |
| 91 | 12.5 | — | 75 | 500° F. | 250 | 600 | Paper | — | — | exc. | — | — |
| 91 | 12.5 | — | 75 | 500° F. | 250 | 250 | Aluminum | 39 | 3.0 | exc. | 6.8, 7.2 | 25.5 |
| 90 | 12.5 | — | 50 | 500° F. | 250 | 500[2] | Paper | — | — | exc. | — | — |
| 90 | 12.5 | — | 50 | 500° F. | 250 | 250 | Aluminum | 39 | 3.0 | exc. | 3.5, 5.5 | 24, 25 |
| 89 | — | 20 | 50 | 500° F. | 250 | 250 | Paper | — | — | ([3]) | — | — |
| 89 | — | 20 | 50 | 500° F. | 250 | 250 | Aluminum | — | — | exc. | 3.5, 4.9 | 21–24 |
| 88 | — | 20 | 50 | 500° F. | 250 | 250 | Paper | — | — | exc. | — | — |
| 88 | — | 20 | 9 | 500° F. | 250 | 300 | Paper | — | — | prob. ok | — | — |
| 88 | — | 20 | 9 | 500° F. | 250 | 500 | Paper | — | — | surging[4] | — | — |
| 88 | — | 20 | 9 | 500° F. | 250 | 250 | Aluminum | — | — | exc. | 4.5, 5.5 | 22.5, 23 |
| Min Spec | | | | | | | | | | | 3.5[5] | 22[5] |

[1]E6005 type with 2.4% random ethylene
[2]Appeared capable of 600 ft/min
[3]Overcoated section stuck to chill roll giving appearance of surging
[4]Operator estimated maximum speed without surging to be about 300 ft/min
[5]Former minimums were 2.5 lbs for adhesion and 12 for heat seal

TABLE 5

ALUMINUM COATED WITH MODIFIED RANDOM COPOLYMER - EVALUATION ON RETORTABLE POUCHES

| Number WRS6 | EVA 360 | Polybutylene 0300 | Melt Flow | Maximum Extrusion Speed ft/min | Heat Seal Strength, lbs. Before Retort | Heat Seal Strength, lbs. After Retort | Slide Drop Test[1] Number of Failures After Number of Drops 1 | 2 | 3 | 4 | 5 | 6 | Taste Test |
|---|---|---|---|---|---|---|---|---|---|---|---|---|---|
| 91 | 12.5 | — | 75 | 600 | 25 | 12 | 0 | 1 | 1 | 4 | 8 | 10 | very slight close to o.k. |
| 90 | 12.5 | — | 50 | >500 | 25 | 15 | 0 | 0 | 0 | 0 | 2 | 6 | very slight close to o.k. |
| 89 | — | 20 | 50 | 250 | 23 | 11 | 0 | 2 | 3 | 6 | 8 | 10 | o.k. |
| 88 | — | 20 | 9 | 300 | 22 | 12 | 0 | 0 | 0 | 2 | 5 | 9 | o.k. |
| Specification | — | — | — | 300 min | 22 min | 20 min | 0–0.5[2] | — | — | — | — | 4 max | o.k. |

[1]Ten water-filled pouches are dropped.
[2]Zero out of 10 is preferred. If one breaks, a second ten are tested. None of the second ten may fail.

ILLUSTRATIVE EMBODIMENT IV

From Illustrative Embodiment III it can be seen that seal strength and drop test are improved without sacrificing coating speed when the melt flow is dropped from 75 to 50. This suggests that a 25 melt flow material should give better seal strength and drop resistance and might still give high coating speeds. Accordingly, in Illustrative Embodiment IV the amount of peroxide was decreased from the amount used in WRS6-90 from Illustrative Embodiment III, resulting in a product (WRS6-93) having a melt flow of 25.

| Polymer Number | WRS6-93 |
|---|---|
| % w EVA | 12.5 |
| Melt Flow | 25 |
| Peel Strength lb/in Heat Seal | 5 |
| Before retort lb | 25 |
| After retort lb | 18 |
| Slide drop test Failures after 6 drops | 2 |

These data show that properties were indeed improved without sacrificing extrusion speed by lowering the melt flow to 25.

ILLUSTRATIVE EMBODIMENT V

According to FDA regulations (Federal Register Vol 45 No. 10 Tues. January 15, 1980, pages 2842–2844) the EVA content of retortable pouches cannot exceed 10% w. A product was therefore manufactured to meet these specifications as follows:

| Polymer Number | WRS6-101 |
|---|---|
| Propylene ethylene copolymer with 2.4% ethylene | 90.1% |
| EVA 360 | 9.9% W |
| Melt Flow of product | 27 |

The above product (WRS6-101) was run on commercial equipment and the following results were obtained:

| Extrusion speed | satisfactory |
|---|---|
| Peel Strength lbs/in | 5 |
| Heat Seal Strength lbs. | |
| Before retort | 28 |
| After retort | 27 |
| Slide drop test Failures after 6 drops | 2 |
| Burst strength lbs. | 75 (min 55) |
| Retortability at 250° F. | pass |

| | |
|---|---|
| -continued | |
| Retortability at 275° F. | pass |

This illustrates that a fully satisfactory product meeting FDA regulations as well as the customer specifications can be produced.

ILLUSTRATIVE EMBODIMENT VI

A composition was prepared containing 90.1% w of a propylene-ethylene copolymer containing 4.4% w of ethylene and 9.9% w of EVA 360. This product was cracked to give a product with a melt flow of 30. This product when extrusion coated on aluminum foil gave the following results:

| | |
|---|---|
| Product Number | WRS6-102 |
| Peel Strength lbs/in | 6 |
| Heat Seal Strength, lbs. | |
| Before retort | 25 |
| After retort | 20 |
| Retortability at 250° F. | pass |
| Burst strength lbs. | 70 (min 55) |

What is claimed is:

1. In a retort-sterilizable laminated structure comprising an aluminum foil or sheet, a heat-sealable polymer layer on one surface of said aluminum foil or sheet, and a heat-resistant resin layer formed on the other surface of said aluminum foil or sheet, the improvement wherein said heat-sealable polymer layer is formed from the composition comprising the cracked product of a blend of a polypropylene copolymer and an ethylene-vinyl acetate copolymer wherein:

(a) the melt flow of said cracked product is between about 15 and about 65 grams per 10 minutes, condition L;

(b) said polypropylene copolymer is a propylene-ethylene copolymer comprising between about 1 and about 10 percent by weight ethylene and has a melt flow of between about 0.5 and about 15 grams per 10 minutes, condition L; and (c) said ethylene-vinyl acetate copolymer has a vinyl acetate content of between about 15 and about 30 percent by weight, and has a melt flow of between about 1 and about 30 grams per 10 minutes, condition E.

2. The structure according to claim 1 wherein said heat-resistant resin layer is formed from a polyester.

3. The structure according to claim 2 wherein said polyester is poly(ethylene terephthalate).

4. The structure according to claim 1 wherein the melt flow of said cracked product is between about 10 and about 50 grams per 10 minutes.

5. The structure according to claim 4 wherein said polypropylene copolymer is a random copolymer comprising between about 1 and about 10 percent by weight ethylene.

6. The structure according to claim 1 wherein said cracked product is prepared by peroxide cracking.

7. The structure according to claim 6 wherein said peroxide is an aliphatic peroxide.

8. The structure according to claim 1 wherein said blend comprises between about 5 and about 25 percent by weight ethylene-vinyl acetate copolymer and between about 95 and about 75 percent by weight polypropylene copolymer.

9. The structure according to claim 1 wherein said heat-sealable layer is formed on the surface of said aluminum foil or sheet by extrusion coating said cracked product at line speeds above about 400 feet per minute.

* * * * *